(12) United States Patent
Avery

(10) Patent No.: US 9,045,154 B2
(45) Date of Patent: Jun. 2, 2015

(54) TRANSPORT DEVICE FOR POWER TROWEL AND METHOD OF USE THEREOF

(76) Inventor: Kirk J. Avery, Green Island, NY (US)

( * ) Notice: Subject to any disclaimer, the term of this patent is extended or adjusted under 35 U.S.C. 154(b) by 222 days.

(21) Appl. No.: 13/536,066

(22) Filed: Jun. 28, 2012

(65) Prior Publication Data

US 2014/0001723 A1 Jan. 2, 2014

(51) Int. Cl.
| | | |
|---|---|---|
| B62B 1/04 | (2006.01) | |
| B62B 1/06 | (2006.01) | |
| B62B 5/00 | (2006.01) | |
| B62B 1/14 | (2006.01) | |
| B62B 1/00 | (2006.01) | |
| B62B 1/26 | (2006.01) | |

(52) U.S. Cl.
CPC ............... *B62B 5/0083* (2013.01); *B62B 1/142* (2013.01); *B62B 2202/10* (2013.01); *B62B 2202/02* (2013.01); *B62B 1/002* (2013.01); *B62B 1/264* (2013.01); *B62B 2203/24* (2013.01); *B62B 5/0086* (2013.01)

(58) Field of Classification Search
CPC ...... B62B 1/26; B62B 1/264; B62B 2202/02; B62B 2202/031; B62B 2202/025; B62B 1/02; B62B 1/04; B62B 1/06; B62B 2202/90
USPC .............. 280/47.131, 47.24, 47.17, 63, 47.15
See application file for complete search history.

(56) References Cited

U.S. PATENT DOCUMENTS

| | | |
|---|---|---|
| 345,090 A | 7/1886 | Walter |
| 2,200,921 A * | 5/1940 | Granell .................. 451/353 |
| 2,600,577 A | 6/1952 | Roe |
| 4,367,880 A | 1/1983 | Harding |
| 4,398,737 A | 8/1983 | Harding |
| 5,088,799 A * | 2/1992 | Redmon et al. .......... 301/111.05 |
| D349,385 S | 8/1994 | Suggs, Sr. |
| 6,059,299 A | 5/2000 | Rust |
| 6,315,310 B1 | 11/2001 | Hurt |
| 6,347,907 B1 | 2/2002 | Halstead |
| D465,897 S | 11/2002 | Smith |
| 6,561,745 B2 | 5/2003 | Rountree |

(Continued)

OTHER PUBLICATIONS

EDCO, Inc.; EDCO Power Trowel Accessories; www.edcoinc.com/accessories-power-trowel.html; last visited Jun. 28, 2012. 2 pages.

(Continued)

*Primary Examiner* — J. Allen Shriver, II
*Assistant Examiner* — Emma K Frick
(74) *Attorney, Agent, or Firm* — Schmeiser, Olsen & Watts, LLP

(57) ABSTRACT

A load transporting device comprising: a central axle portion having at least one wheel, a first construction equipment engagement portion operably connected to the central axle portion, the first construction engagement portion accommodating a curvilinear portion of a construction equipment having a curvature, wherein the first construction engagement portion matches the curvature of the curvilinear portion of the construction equipment, and a second construction equipment engagement portion operably connected to the central axle portion, the second construction engagement portion accommodating an operation component of the construction equipment is provided. Furthermore, an associated method is also provided.

16 Claims, 6 Drawing Sheets

(56) References Cited

U.S. PATENT DOCUMENTS

| | | |
|---|---|---|
| 7,350,790 B1 | 4/2008 | Wilson |
| 7,988,383 B2 * | 8/2011 | Hickmann ................ 404/133.1 |
| 8,172,240 B2 * | 5/2012 | Zimmerman et al. ....... 280/43.1 |
| 2002/0168259 A1 * | 11/2002 | McConnell ................... 414/490 |
| 2003/0002968 A1 | 1/2003 | Nance |
| 2007/0187915 A1 * | 8/2007 | Filiatrault ................ 280/47.131 |
| 2001/0274526 | 11/2011 | Kusick |

OTHER PUBLICATIONS

Stevenson Fabrication Services, Inc.; Power Trowel Transporter: Transports Power Trowels Safely; www.stevensonfabrication.com/troweltamer.htm; last visited Jun. 28, 2012. 1 page.

* cited by examiner

TRANSPORT DEVICE FOR POWER TROWEL AND METHOD OF USE THEREOF

FIELD OF TECHNOLOGY

The following relates to a load transporting device, and more specifically to embodiments of a load transporting device for use with a power trowel.

BACKGROUND

A power trowel is a piece of construction equipment that is commonly to apply a smooth finish to concrete slabs. The power trowel can weight in excess of three-hundred pounds, which can create many difficulties when transporting the power trowel to different locations. For instance, a power trowel loaded onto the back of a work truck must be transported to the particular area where the concrete work is to take place. Normally, two to three construction workers must act in concert to maneuver and transport the heavy power trowel from place-to-place, due in large part to the interfering, round-blade cage coupled with the overall weight of the device. Because more than one worker must be present to transport the power trowel, a single worker cannot be sent to a jobsite to finish the concrete slabs; an additional worker must be sent along to help transport the power trowel from the truck to the concrete slab. Construction companies must pay for the extra worker simply to help maneuver and transport the power trowel. Even if more than one worker is present at the jobsite, the operator of the power trowel must ask another worker to cease working on a different task to assist in the moving and transporting of the power trowel.

Thus, a need exists for an apparatus and method for a load transporting device that accommodates the blade cage of a power trowel, yet provides load support for the weight of the power trowel so as to facilitate easy transport of the power trowel by a single user.

SUMMARY

A first aspect relates generally to a load transporting device comprising a central axle portion having at least one wheel, a first construction equipment engagement portion operably connected to the central axle portion, the first construction engagement portion accommodating a curvilinear portion of a construction equipment having a curvature, wherein the first construction engagement portion matches the curvature of the curvilinear portion of the construction equipment, and a second construction equipment engagement portion operably connected to the central axle portion, the second construction engagement portion accommodating an operation component of the construction equipment.

A second aspect relates generally to a load transporting device comprising a central axle portion having at least one wheel mounted thereto, the central axle portion including a first cage engagement member to accept a protective cage of a power trowel at a first location of the protective cage, a first arm extending from the central axle portion at a first angle to match a curvature of the protective cage of the power trowel, the first arm having a second cage engagement member to accept the protective cage of the power trowel at a second location of the protective cage, a second arm extending from the central axle portion at a second angle to match the curvature of the protective cage of the power trowel, the second arm having a third cage engagement member to accept the protective cage of the power trowel at a third location of the protective cage, and an operation component engagement member configured to accommodate an operation component of the power trowel.

A third aspect relates generally to a method of transporting a construction equipment comprising providing a load transporting device having a central axle portion having at least one wheel, and angularly extending a plurality of arms from the central axle portion to match a curvature of a curvilinear portion of a construction equipment, wherein the plurality of angularly extending arms accommodate a load of the construction equipment.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
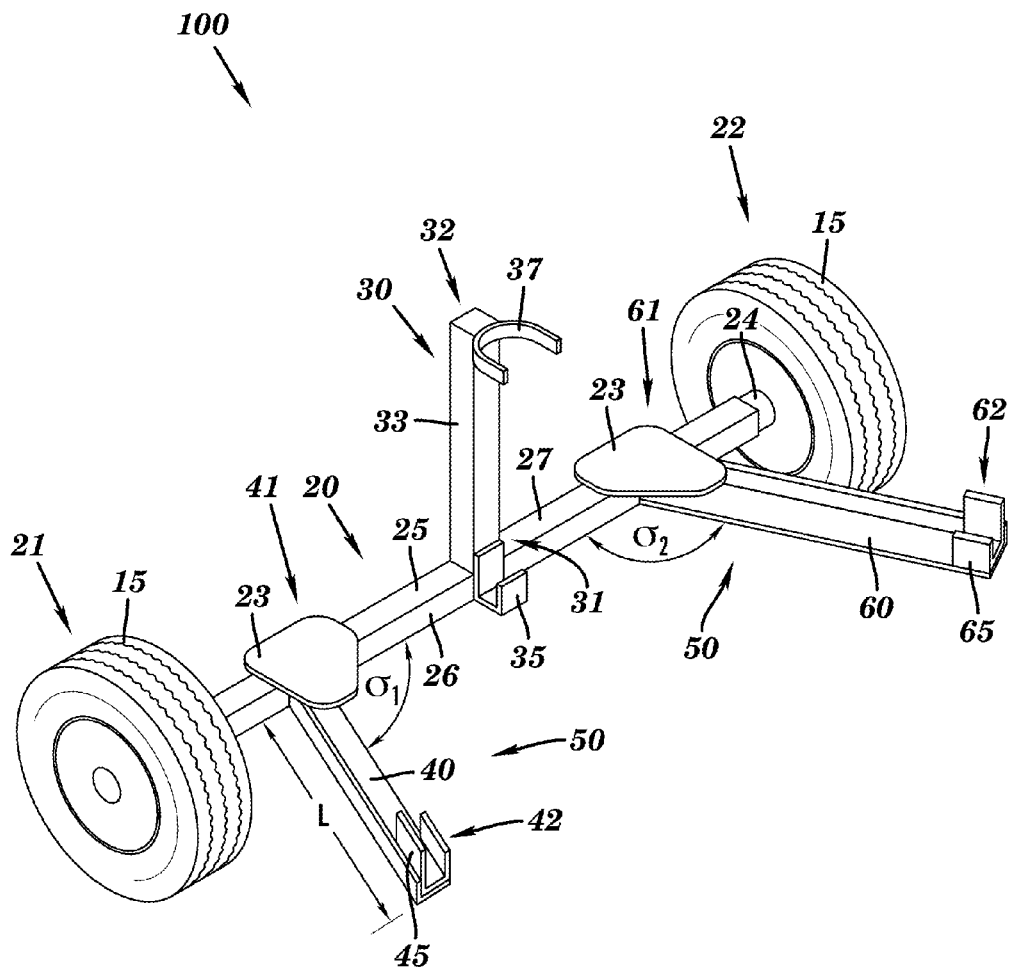
FIG. 1 depicts a perspective view of an embodiment of a load transporting device.
Figure 2:
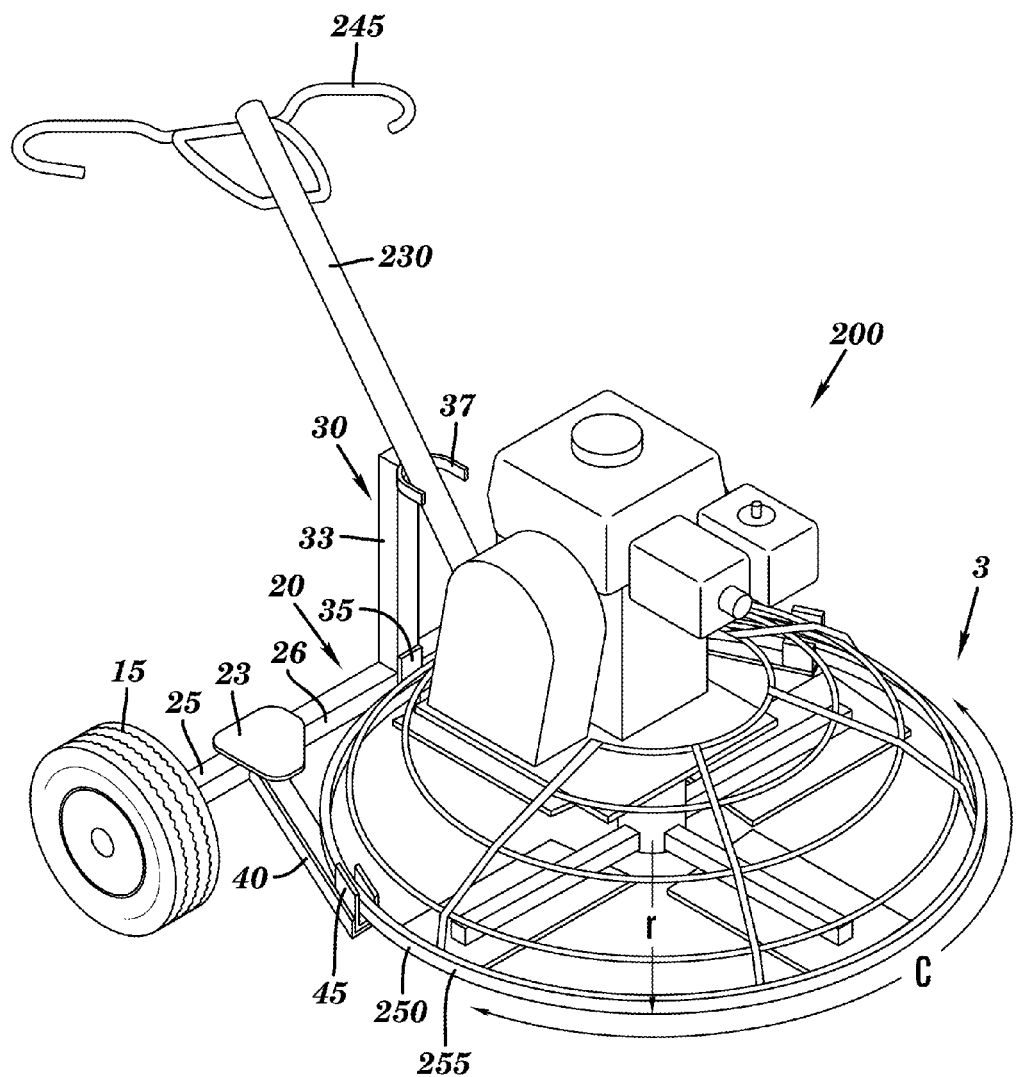
FIG. 2 depicts a perspective view of an embodiment of the load transporting device engaged with an embodiment of a power trowel.

Referring to the drawings, FIG. 1 depicts an embodiment of a load transporting device 100. Embodiments of the load transporting device 100 may be used to transport a load. For instance, the load transporting device 100 may be used to transport, move, relocate, etc., an object having a weight, or load. The load transporting device 100 may be configured to transport construction equipment from place-to-place on a jobsite, or on and off a work truck. Moreover, embodiments of the load transporting device 100 may be designed to accommodate a power trowel 200. Embodiments of a power trowel 200 are shown in FIG. 2. A power trowel, such as power trowel 200, may include a protective cage 250 having a curvature, C, a radius, r, a handle portion 230, and a handlebar 245. The protective cage 250 of the power trowel 250 may be a curvilinear portion of a construction equipment, and may be engaged by a plurality of cage engagement members at various locations on the protective cage 250. The handle portion 230 and the handlebar 245 may be used by a construction worker, or user, to steer the load transporting device 100 when the power trowel 200 is engaged with the load transporting device 100. The power trowel 200 may be a significant load for a single construction worker, weighing in excess of 100 pounds. Embodiments of power trowel 200 may be a conventional power trowel of varying sizes, such as a walk-behind power trowel, a power float, a trowel machine, a construction equipment used to apply a finish to a concrete slab, and the like, or any construction equipment having a curvilinear portion, such as a protective cage. Further exemplary embodiments of the power trowel may be a walk-behind power trowel having a horsepower from 6-13 hp, and may include a radius of 36-48" (inches).

Referring back to FIG. 1, embodiments of the load transporting device 100 may include a central axle portion 20, a first construction equipment engagement portion 50, and a second construction equipment engagement portion 30. Embodiments of the load transporting device 100 may include a central axle portion 20 having at least one wheel 15, a first construction equipment engagement portion 50 operably connected to the central axle portion 20, the first construction engagement portion 50 accommodating a curvilinear portion of a construction equipment 200 having a curvature C, wherein the first construction engagement portion 50 matches the curvature C of the curvilinear portion of the construction equipment 200, and a second construction equipment engagement portion 30 operably connected to the central axle portion 20, the second construction engagement portion 30 accommodating an operation component 230 of the construction equipment 200. Embodiments of the load transporting device 100 may further include a central axle portion 20 having at least one wheel 15 mounted thereto, the central axle portion 20 including a first cage engagement member 35 to accept a protective cage 250 of a power trowel 200 at a first location of the protective cage 250, a first arm 40 extending from the central axle portion 20 at a first angle, $Ø_1$, to match a curvature C of the protective cage 250 of the power trowel 200, the first arm 40 having a second cage engagement member 45 to accept the protective cage 250 of the power trowel 200 at a second location of the protective cage 250, a second arm 60 extending from the central axle portion 20 at a second angle, $Ø_2$, to match the curvature C of the protective cage 250 of the power trowel 200, the second arm 60 having a third cage engagement member 65 to accept the protective cage 250 of the power trowel 200 at a third location of the protective cage 250, and an operation component engagement member 37 configured to accommodate an operation component 230 of the power trowel 200.

Embodiments of the load transporting device 100 may include a central axle portion 20. The central axle portion 20 may include a first end 21, a second end 22, a central member 25, and at least one wheel 15. Embodiments of the central member 25 may house, protect, surround, shield, cover, partially cover, etc., an axle 24. In other words, an axle 24, such as a central shaft for a rotating wheel 15 or gear, may be located within, entirely within, or primarily within the central member 25 of the central axle portion of the load transporting device 100. Embodiments of the axle 24 may be fixed to the wheels 15, rotating with them, or fixed to its surroundings, with the wheels 15 rotating around the axle 24. In embodiments where the axle 24 is fixed to the wheel 15, one or more bearings or bushings may be provided at one or more mounting points where the axle 24 is supported. In embodiments where the axle 24 is fixed to the surroundings, a bearing or bushing may sit inside a hole in the wheel 15 to allow the wheel 15 or gear to rotate around the axle 24. Embodiments of wheel 15 may be a tire fitted around a wheel rim, or any comparable round device that may be mounted to the central axle portion 20.

Furthermore, embodiments of the central axle portion 20 may include a first cage engagement member 35. Embodiments of the first cage engagement member 35 may be located on an inward facing surface 26. The inward surface 26 may be described as an outer surface of the central member 25 that faces the power trowel 200 when engaging the power trowel 200. Embodiments of the first cage engagement member 35 may be configured to engage the protective cage 250 of the power trowel 200 at a first location of the protective cage 250. For instance, when the power trowel is engaged with the load transporting device 100 in a first position of engagement, the first cage engagement member 35 accepts a portion of the protective cage 250 of the power trowel. Embodiments of the first engagement portion 35 of the central axle portion 20 physically contacts and mechanically interferes with the protective cage 250 of the power trowel 200, providing support for a portion of the load, or weight, of the power trowel 200. The first cage engagement member 35 may have an orientation with respect to the central member 25. In an exemplary embodiment, the first cage engagement member 35 can have a parallel or substantially parallel orientation with respect to the central member 25. Moreover, embodiments of the first cage engagement member 35 may be a groove, a channel, a U-shaped cross-member, a square or rectangular-shaped cross-section member, and the like that may be attached to the central member 25. The first cage engagement member 35 may be welded to the central member 25, or may be fastened to the central member 25 through conventional fastening means, such as screws, bolts, adhesives, and the like.

Embodiments of the central axle portion 20 may also include one more plates 23. The plates 23 may be disposed at any point along the central member 25; one or more plates 23 may be disposed on a top surface 27 of the central member 25 of the central axle portion 20. Embodiments of the top surface 27 may be an outer surface of the central member 25 that faces away from the ground during operation of the load transporting device 100, or faces directly away from the ground while stationary. Embodiments of the plates 23 may be used to accommodate a foot or hand of the user to aid in a manipulation of the load transporting device 100. For example, a user may place his or her foot on of the plates 23 to perform a tilting operation of the load transportation device 100 to facilitate proper initial engagement between the load transporting device 100 and/or to facilitate movement of the load transporting device 100 with or without the power trowel 200. Also, a user may place his or her foot on one or more of the plates 23 to aid in the steering of the load transporting device. The plates 23 may offer more flat surface area than the central member 25, which aids in the manipulation of the load transporting device. Embodiments of the foot plates 23 may be welded to the central member 25 or the first or second arms 40, 60 (and potentially to both the center member 25 and a portion of the first and second arm 40, 60) or may be fastened to the central member 25 or the first or second arms 40, 60 (and potentially to both the center member 25 and a portion of the first and second arm 40, 60) through conventional fastening means, such as screws, bolts, adhesives, and the like. In addition, the one or plates 23 may be comprised of metal, and may include a grip retention top surface, such as diamond plates, a plurality of grooves, knurling, etc. to hinder slippage when engaging or utilizing the plates 23.

Moreover, embodiments of the central axle portion 20 may be comprised of metal (with the possible exception of a portion of the wheel 15 being comprised of a non-metal, such as rubber or plastic). For instance, the central member 25 may be comprised of aluminum, stainless steel, and other construction metals, wherein the central member 25 may have a square, rectangular, rounded, circular, or curvilinear cross-section, and may have varying gauges, thickness, diameters etc. Similarly, the axle 24 located at least partially within the central member 25 may be comprised of aluminum, stainless steel, or other metal, and may be rod-shaped, as one having skill in the art would understand. Manufacture of the components of the central axle portion 20 may include casting, extruding, cutting, turning, drilling, compression molding, stamping, drawing, fabrication, punching, plating, or other fabrication methods that may provide efficient production of the metal components, including the welding of components to the central member 25. However, those having skill in the art should appreciate that the components of the central axle portion 20, such as the first cage engagement member 35 may be made of a material other than metal, such as a plastic or a composite, that can be fastened to the central member 35 or adhered to the central member 25. Even further, it is possible that the central member 25 may be comprised of a material other than metal, such as plastics, composites, etc.

Referring still to FIG. 1, embodiments of the load transporting device 100 may include a first construction engagement portion 50. Embodiments of a first construction equipment engagement portion 50 may be operably connected to the central axle portion 20. For instance the first construction engagement portion 50 may be welded or fastened to the central member 25. Embodiments of the first construction engagement portion 50 may accommodate a curvilinear portion, such as a curved portion of the protective cage 250 of the power trowel 200. The curvilinear portion of the protective cage 250 may have a curvature, C, and the first construction engagement portion 50 may include structure that matches or corresponds to the curvature, C, of the protective cage 250. Embodiments of the first construction engagement portion 50 may engage, physically contact, etc. the protective cage 250 of the power trowel 200 at more than one location. For instance, the first construction engagement portion 50 may include a plurality of angularly extending arms 40, 60 that can extend from the central axle portion 20 a distance, L (length), and at a particular angle, Ø. The distance the plurality of angularly extending arms 40, 60 may extend is a length of the arms, L, and the angle, Ø, with respect to the central member 25, and the length, L, of the arms may be adjusted to properly correspond or match a curvature, C, of the protective cage 250 of the power trowel 200. One advantage of the plurality of angularly extending arms of the first construction equipment engagement portion 50 can be that the total width of the central member 25 may be reduced, or limited, which reduces the overall size of the load transporting device 100. An additional advantage may be that the angular extending arms 40, 60 reside closer to a middle portion of the central member 25 which can provide better balance and load support, and can prevent dipping or resultant fracture or damage to stress when the power trowel 200 is loaded onto the device 100.

Embodiments of the plurality of angularly extending arms may include a first arm 40 and a second arm 60. Embodiments of the first arm 40 may include a first end 41 and a second end 42. The first end 41 of the first arm 40 may be operably connected to the central member 25 of the central axle portion 20, and may angularly extend from the central member 25 to accommodate a curved portion of the protective cage 250 of the power trowel 200. In other words, embodiments of a first arm 40 may extend from the central axle portion 20 at a first angle, $Ø_1$, to match at least one of a curvature, C, and a radius, r, of the protective cage 250 of the power trowel 250. Embodiments of the curvature, C, of the protective cage 250 may be an amount of deviation from a straight line that an outer edge 255 of the protective cage 250 undergoes. For example, an outer edge 255 of the protective cage 250 at a particular location on the outer edge 255 has a curvature depending on various geometric dimensions of the protective cage 250, such as radius, r. Embodiments of the protective cage 250 may have a constant curvature or a varying curvature; the protective cage 250 may be circular, elliptical, curvilinear, or otherwise curved. A curvature of the protective cage 250 may be matched by forming the length, $L_1$, and first angle, $Ø_1$, to accommodate a curvature of the protective cage 250 of the power trowel. In exemplary embodiment, the first angle, $Ø_1$, may greater than 90°. The first arm 40 may also be fixedly attached to the central member 25.

However, the first angle, $Ø_1$, may be adjustable. For instance, an angle of the plurality of angularly extending arms 40, 60 may be adjustable to properly receive and support a protective cage 250 of a power trowel. The first arm 40 may be rotatably attached to the central member 25 of the central axle portion 20 such that the first arm may be partially rotatable about the central member 25. Angularly adjusting or rotating the first arm 40 with respect to the central member 25 may be accomplished by a fastening means that can be tightened and loosened by a user, allowing a user to loosen the connection or temporarily remove the first arm 40 from the central member 25, and then re-tighten or re-connect the first arm 40 to the central member 25. This may be accomplished using fastening means and techniques known to those having skill in the art, such as a bolt, a wing nut, and the like.

Embodiments of the first arm 40 may be fixedly or rotatably attached to the central member 25 of the central axle portion 20 or may be slidably attached to the central member 25. Embodiments of the first arm 40 that are fixedly attached to the central member 25 may be welded to the central member 25 or structurally integral with the central member 25. Embodiments of the first arm 40 that are slidably attached ort slidably mounted to the central member 25 may be displaced in an axial direction along the axis of the central member 25. Slidably adjusting the axial location of the first arm 40 along the central member 25 may allow a user to accommodate power trowels 200 of different sizes, having various curvatures and radii. The first arm 40 may be slidable along the central member 25 through various means known to those having skill in the art. For example, the first arm 40 may be attached by an external or independent clamp that can be tightened or loosed to allow movement of the first arm 40. Other examples may include a portion proximate the first end 41 of the first arm that surrounds the central member 25, wherein the portion that surrounds the central member 25 includes an opening, such as a hole, to allow a bolt or comparable rods to pass through and pass through multiple openings in the central member 25 (not shown). Those having skill in the art should appreciate the first arm 40 may be both rotatably attached and slidably attached to the central member 25.

Moreover, embodiments of the first arm 40 may include a second cage engagement member 45 proximate or otherwise near the second end 42 of the first arm 40. Embodiments of the first arm 40 may include the second cage engagement member 45 to accept the protective cage 250 of the power trowel 250 at a second location of the protective cage 250. For instance, when the power trowel 200 is engaged with the load transporting device 100 in a first position of engagement, the second cage engagement member 45 may accept, support, engage with, accommodate, etc., a portion of the protective cage 250 of the power trowel 200. Embodiments of the second engagement portion 45 of the first construction engagement portion 50 may physically contact and mechanically interfere with the protective cage 250 of the power trowel 200, providing support for a portion of the load, or weight, of the power trowel 200. Embodiments of the second cage engagement member 45 may have an orientation with respect to the first arm 40. For instance, the second cage engagement member 45 may have a parallel or substantially parallel orientation with respect to the first arm 40.

Furthermore, embodiments of the second cage engagement member 45 may have a fixed orientation or a variable orientation with respect to the first arm 40. For example, a preassembled configuration of the load transporting device 100 may include a second cage engagement member 45 fixedly attached to the first arm having a fixed orientation at an angle with respect to the first arm 40 to ensure proper receipt of the outer edge 255 of the protective cage 250 power trowel 200. Other embodiments of a load transporting device 100 may include a second cage engagement member 45 adjustably attached to the first arm 40. In other words, the second cage engagement member 45 may be rotated and/or adjusted to change an orientation with respect to the first arm 40 to ensure proper receipt of the outer edge 255 of the protective cage 250 for power trowels 200 having different curvatures and/or radii. Adjusting the orientation of the second cage engagement member 45 with respect to the first arm 40 may be accomplished by a fastening means that can be tightened and loosened by a user, allowing a user to loosen the connection or temporarily remove the second engagement member 45 from the first arm 40, and then re-tighten or re-connect the second cage engagement member 45 to the first arm 40. This may be accomplished using fastening means and techniques known to those having skill in the art, such as a bolt, a wing nut, and the like. Moreover, embodiments of the second cage engagement member 45 may be a groove, a channel, a U-shaped cross-member, a square or rectangular-shaped cross-section member, and the like that may be attached to one of the plurality of angularly extending arms 40, 60 (i.e. the first arm 40). The second cage engagement member 45 may be welded to the first arm 40, or may be fastened to the first arm 40 through conventional fastening means, such as screws, bolts, adhesives, and the like.

Embodiments of the plurality of angularly extending arms may include a first arm 40 and a second arm 60. Embodiments of the second arm 60 may include a first end 61 and a second end 62. The first end 61 of the second arm 60 may be operably connected to the central member 25 of the central axle portion 20, and may angularly extend from the central member 25 to accommodate a curved portion of the protective cage 250 of the power trowel 200. In other words, embodiments of a second arm 60 may extend from the central axle portion 20 at a second angle, $Ø_2$, to match at least one of a curvature, C, and a radius, r, of the protective cage 250 of the power trowel 250. In exemplary embodiment, the second angle, $Ø_2$, may greater than 90°. The second arm 60 may also be fixedly attached to the central member 25.

However, the second angle, $Ø_2$, may be adjustable. For instance, an angle of the plurality of angularly extending arms 40, 60 may be adjustable to properly receive and support a protective cage 250 of a power trowel 200. The second arm 60 may be rotatably attached to the central member 25 of the central axle portion 20 such that the second arm 60 may be partially rotatable about the central member 25. Angularly adjusting or rotating the second arm 60 with respect to the central member 25 may be accomplished by a fastening means that can be tightened and loosened by a user, allowing a user to loosen the connection or temporarily remove the second arm 60 from the central member 25, and then re-tighten or re-connect the second arm 60 to the central member 25. This may be accomplished using fastening means and techniques known to those having skill in the art, such as a bolt, a wing nut, and the like.

Embodiments of the second arm 60 may be fixedly or rotatably attached to the central member 25 of the central axle portion 20 or may be slidably attached to the central member 25. Embodiments of the second arm 60 that are fixedly attached to the central member 25 may be welded to the central member 25 or structurally integral with the central member 25. Embodiments of the second arm 60 that are slidably attached or slidably mounted to the central member 25 may be displaced in an axial direction along the axis of the central member 25. Slidably adjusting the axial location of the second arm 60 along the central member 25 may allow a user to accommodate power trowels 200 of different sizes, having various curvatures and radii. The second arm 60 may be slidable along the central member 25 through various means known to those having skill in the art. For example, the second arm 60 may be attached by an external or independent clamp that can be tightened or loosed to allow movement of the first arm 40. Other examples may include a portion proximate the first end 61 of the first arm that surrounds the central member 25, wherein the portion that surrounds the central member 25 includes an opening, such as a hole, to allow a bolt or comparable rods to pass through and pass through multiple openings in the central member 25 (not shown). Those having skill in the art should appreciate the second arm 60 may be both rotatably attached and slidably attached to the central member 25.

Moreover, embodiments of the second arm 60 may include a third cage engagement member 65 proximate or otherwise near the second end 62 of the second arm 60. Embodiments of the second arm 60 may include the third cage engagement member 65 to accept the protective cage 250 of the power trowel 250 at a third location of the protective cage 250. For instance, when the power trowel 200 is engaged with the load transporting device 100 in a first position of engagement, the third cage engagement member 65 may accept, support, engage with, accommodate, etc., a portion of the protective cage 250 of the power trowel 200, at a location generally opposing to the location where the second cage engagement member 45 engages the outer edge 255 to provide sufficient balance and support. Embodiments of the third engagement portion 65 of the first construction engagement portion 50 may physically contact and mechanically interfere with the protective cage 250 of the power trowel 200, providing support for a portion of the load, or weight, of the power trowel 200 on an opposing or different side of the protective cage 250 than the contact point between the second cage engagement member 45 and the protective cage 250. Embodiments of the third cage engagement member 65 may have an orientation with respect to the second arm 60. For instance, the third cage engagement member 65 may have a parallel or substantially parallel orientation with respect to the second arm 60.

Furthermore, embodiments of the third cage engagement member 65 may have a fixed orientation or variable orientation with respect to the second arm 60. For example, a preassembled configuration of the load transporting device 100 may include a third cage engagement member 65 fixedly attached to the first arm having a fixed orientation at an angle with respect to the second arm 60 to ensure proper receipt of the outer edge 255 of the protective cage 250 power trowel 200. Other embodiments of a load transporting device 100 may include a third cage engagement member 65 adjustably attached to the second arm 60. In other words, the third cage engagement member 65 may be rotated and/or adjusted to change an orientation with respect to the second arm 60 to ensure proper receipt of the outer edge 255 of the protective cage 250 for power trowels 200 having different curvatures and/or radii. Adjusting the orientation of the third cage engagement member 65 with respect to the second arm 60 may be accomplished by a fastening means that can be tightened and loosened by a user, allowing a user to loosen the connection or temporarily remove the third cage engagement member 65 from the second arm 60, and then re-tighten or re-connect the third cage engagement member 65 to the second arm 60. This may be accomplished using fastening means and techniques known to those having skill in the art, such as a bolt, a wing nut, and the like. Moreover, embodiments of the third cage engagement member 65 may be a groove, a channel, a U-shaped cross-member, a square or rectangular-shaped cross-section member, and the like that may be attached to one of the plurality of angularly extending arms 40, 60 (i.e. the second arm 60). The third cage engagement member 65 may be welded to the second arm 60, or may be fastened to the second arm 60 through conventional fastening means, such as screws, bolts, adhesives, and the like.

Embodiments of the first construction equipment engagement portion 50 may be comprised of metal. For instance, the first arm 40 and the second arm 60 may be comprised of aluminum, stainless steel, and other construction metals, wherein the first arm 40 and the second arm 40 may have a square, L-shaped, U-shaped, rectangular, rounded, circular, or curvilinear cross-section, and may have varying gauges, thickness, diameters etc. Manufacture of the components of the first construction equipment engagement portion 50 may include casting, extruding, cutting, turning, drilling, compression molding, stamping, drawing, fabrication, punching, plating, or other fabrication methods that may provide efficient production of the metal components, including the welding of components to the central member 25 or to the first and second arms 40, 60. However, those having skill in the art should appreciate that the components of the first construction equipment engagement portion 50, such as the second cage engagement member 45 and the third cage engagement member 65 may be made of a material other than metal, such as a plastic or composite, that can be fastened to the first arm 40 and the second arm 60, respectively, or adhered to the first arm 40 and the second arm 60, respectively. Even further, it is possible that the first arm 40 and the second arm 60 may be comprised of a material other than metal, such as plastics, composites, etc.

Referring again to FIG. 1, embodiments of the load transporting device 100 may include a second construction equipment engagement portion 30. Embodiments of a second construction equipment engagement portion 30 may be operably connected to the central axle portion 20, and may accommodate an operating portion 230 of the construction equipment 200. Embodiments of the second construction equipment engagement portion 30 may include a vertical member 33 and an equipment operation component engagement member 37. Embodiments of the vertical member 33 may have a first end 31 and a second end 32. Proximate or otherwise near the first end 31, the vertical member 33 may be operably connected to the central member 25 of the central axle portion 20. In one embodiment, the vertical member 33 may be welded to the central member 25. In another embodiment, the vertical member 33 may be structurally integral to the central member 25. In yet another embodiment, the vertical member 33 may be fastened to the central member 25 through various fastening members/means known by those having skill in the art. Embodiments of the vertical member 33 may extend in a generally upward direction from the central member 25 of the central axle portion 20. Moreover, an equipment operation component engagement member 37 may be disposed proximate or otherwise near the second end 32 of the vertical member 33. In some embodiments, the operation component engagement member may be the vertical member 33. Embodiments of the equipment operation component engagement member 37 may be configured to accept, engage with, collect, secure, etc. an operating component 230 of the power trowel 200. An operation component 230 may be a handle, a rod, a steering component, an extension, or any component that is operably connected to the construction equipment 200 and can be used to operate, direct, lift, steer, manipulate, and/or maneuver the construction equipment. In an exemplary embodiment, the operation component 230 may be a handle of a power trowel. The equipment operation component engagement member 37 may receive a portion of the operation component 230 and may at least partially surround the operation component 230 to hinder lateral or side-to-side movement of the power trowel 200 during operation of the load transporting device 100. Embodiment of the equipment operation component engagement member 37 may be a rounded section of material, such as metal, that may be attached, fixedly or otherwise, to the vertical member to assist in aligning, corralling, securing, supporting, seizing, grabbing, and the like, of the operation component 230 of the construction equipment 200. Embodiments of the second construction equipment engagement portion 30 may include one or more operation component engagement members 37.

Figure 3:
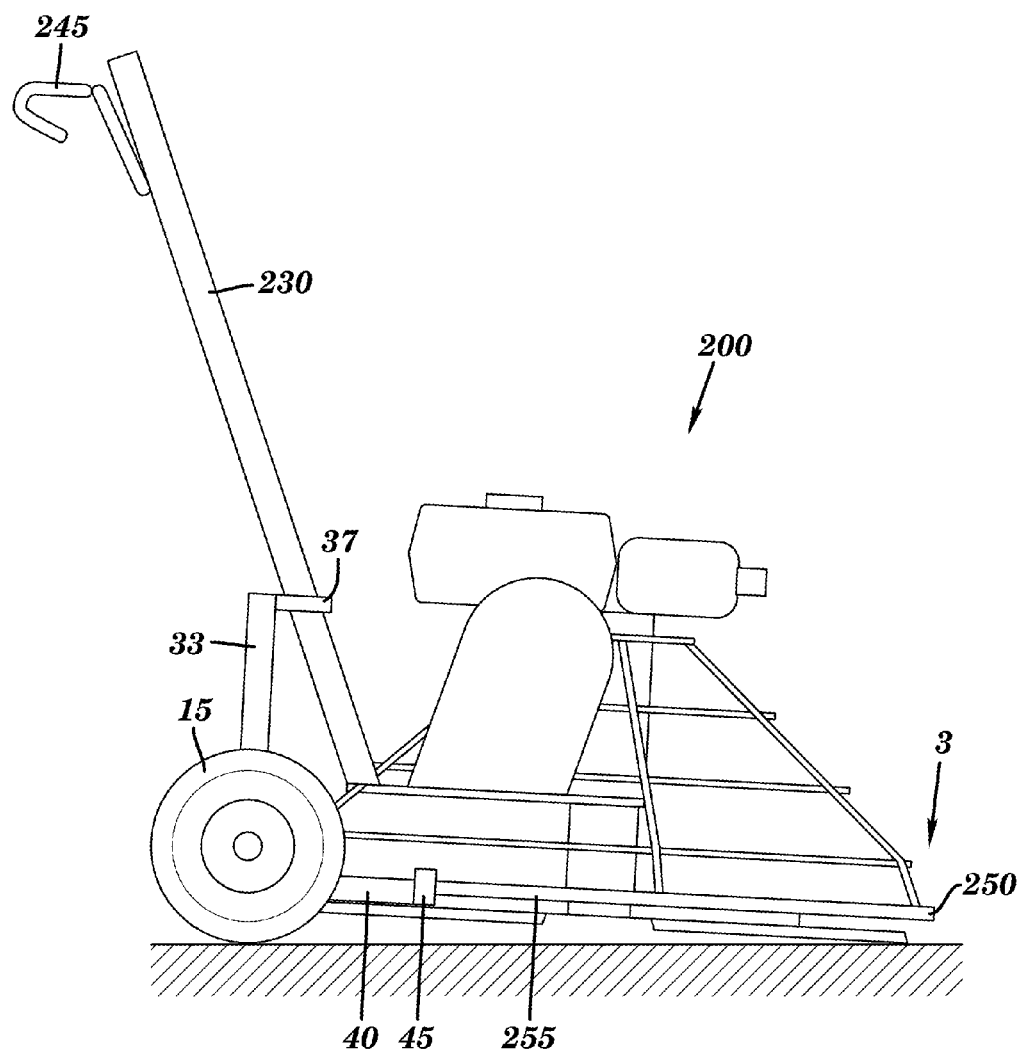
FIG. 3 depicts a side view of an embodiment of the load transporting device engaged with an embodiment of the power trowel in a first position.
Figure 4:
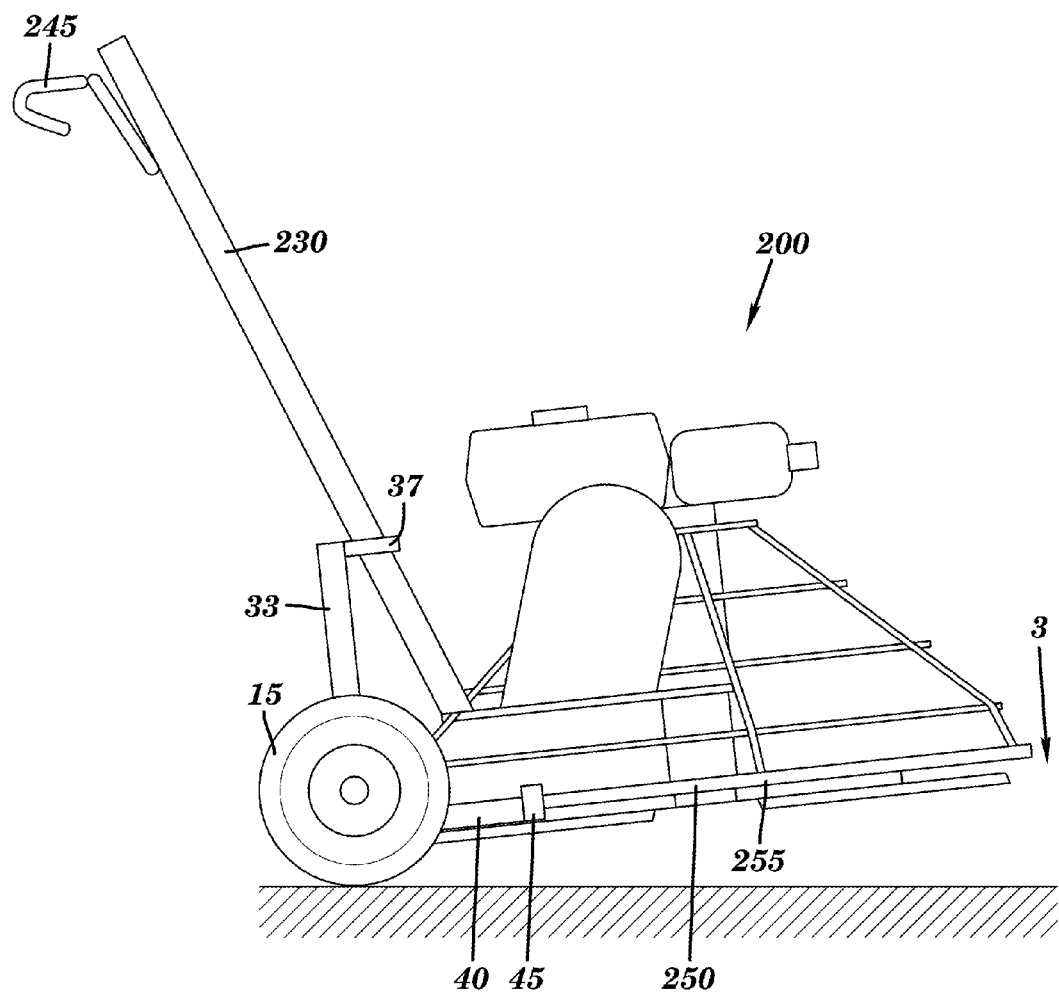
FIG. 4 depicts a side view of an embodiment of the load transporting device engaged with an embodiment of the power trowel in a second position.

With reference to FIGS. 2-4, the manner in which a user may operate the load transporting device 100 to transport a construction equipment, such as a power trowel 200, will now be described. FIGS. 2 and 3 depict an embodiment of the load transporting device 100 in a first position of engagement with the power trowel 200. To achieve the first position, a user may bring the load transporting device 100 into proximity of the power trowel 200. Once the load transporting device 100 is within a close range of the power trowel 200, the user may lift or otherwise manipulate the power trowel 200 (e.g. operating the operation component 230—or handle—of the construction equipment) just slightly to create a clearance for the load transporting device 100 to advance underneath the power trowel and engage the protective cage 250 of the power trowel 200. As the load transporting device 100 is advanced toward and underneath the protective cage 250, the user may align the plurality of angularly arms 40, 60 with the protective cage 250, and more specifically, the user may align the first, second, and third cage engagement members 35, 45, 65 for engagement with the outer edge 255 of the protective cage 250. When the outer edge 255 of the protective cage 250 is engaged, received, accepted, and supported by the first, second, and third cage engagement members, 35, 45, 65, the first position of engagement can be achieved. In some embodiments, the user need not lift the power trowel 200, and the arms 40, 60 may be advanced underneath the protective cage 250 and into the first position of engagement. FIG. 4 depicts an embodiment of a second position of engagement, wherein the load transporting device 100 is configured to transport the power trowel 200. Those having skill in the art should appreciate that the power trowel can be transported when in the first position of engagement, but transportation and/or movement of the device 100 and power trowel 200 may be made easier when moving in the second position of engagement. To achieve the second position of engagement as shown in FIG. 4, a user may grip and pull back on the operation component 230 which acts to exert a force against the second construction equipment engagement portion 30, in particular the vertical member 33 and/or the operation component engagement member 37 proximate the second end 32 of the vertical member 33, to achieve rotation about the axle 24 and provide lift of the power trowel 200 engaged with the device 100. In the second position of engagement, the device 100 may lift the power trowel 200 and provide a greater clearance at a forward end 3 to allow convenient movement, transport, etc of the power trowel 200 from location-to-location. Because of the support provided by the plurality of angularly extending arms 40, 60, and central member 20 to support the weight of the power trowel, and the at least one wheel 15 mounted thereto, a single user may achieve the second position of engagement and transport the device relatively easily from one location to another, without the need of assistance from another worker.

Figure 5:
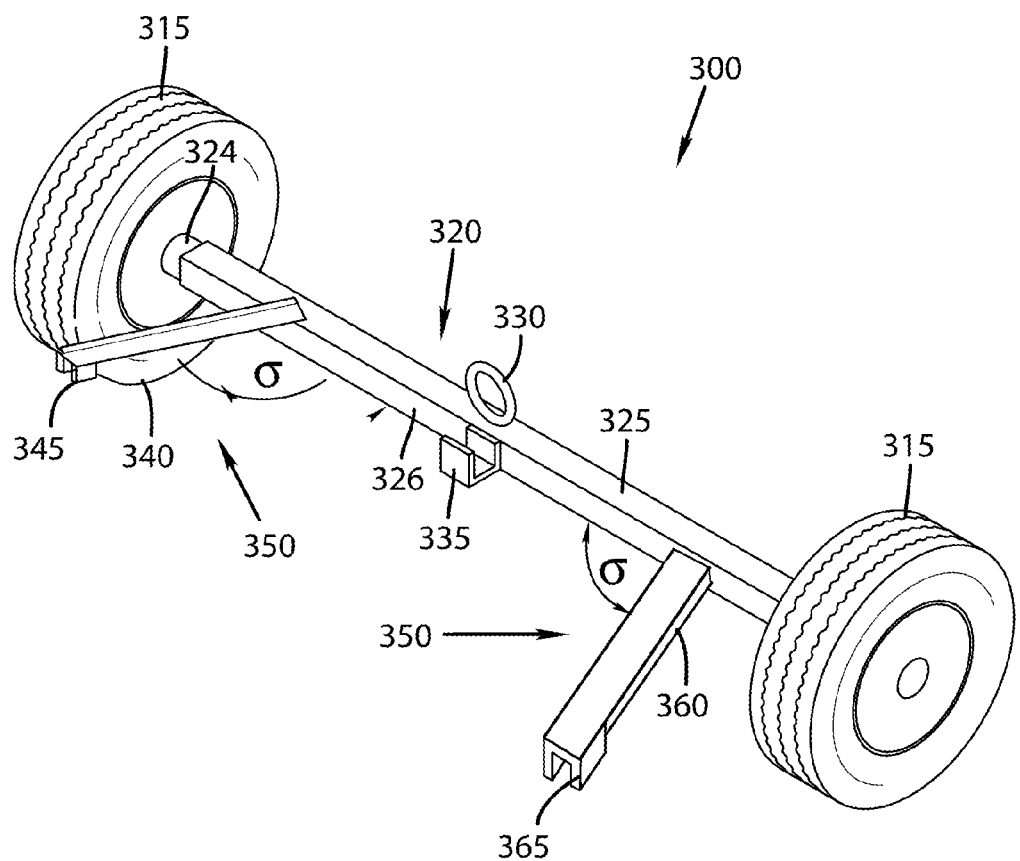
FIG. 5 depicts a perspective view of an embodiment of a secondary load transport device.
Figure 6:
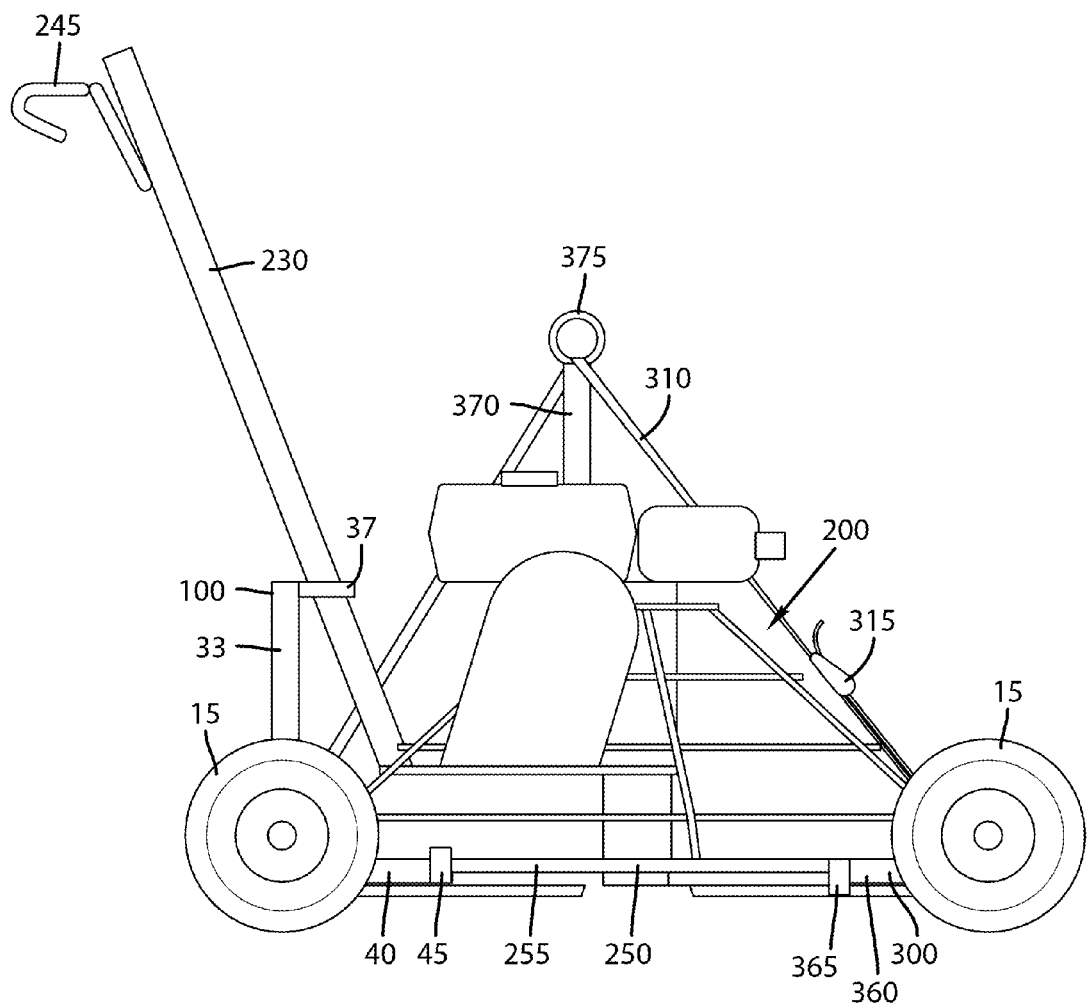
FIG. 6 depicts a side view of an embodiment of the load transporting device and an embodiment of the secondary load transporting device in a secured position with an embodiment of the power trowel.

Referring now to FIGS. 5 and 6, embodiments of the load transporting device 100 may further include a secondary load transporting device 300. Embodiments of the load transporting device 300 and the components forming the secondary load transporting device 300 may share the same or substantially the same structural and/or functional aspects of the load transporting device 100 and the components forming the load transporting device 100. For example, the secondary load transporting device 300 may include a central axle portion 320 having an axle 324, a construction equipment engagement portion 350 configured to engage a curvilinear portion of a construction equipment, such as the protective cage 250 of a power trowel 200. Additionally, the secondary load transporting device 300 may include a first cage engagement member 335 operably attached to a central member 325, a second cage engagement member 345 operably connected to a first arm 340, and a third cage engagement member 365 operably attached to a second arm 360. However, embodiments of the cage engagement members 335, 345, 365 may be facing downward and engage a top surface of the cage 250 of the power trowel 200 to prevent the secondary load transporting device 300 from disengaging the cage 250 due to gravity. Moreover, embodiments of the secondary load transporting device 300 may include a connection device 330 on the central axle portion 320 configured to allow a strap device 310 to pass through and secure the secondary load transporting device 300 to the load transporting device 100. In some embodiments, an additional connection device 375 may be located or placed onto the power trowel 200 to allow the strap device 310 to pass through and eventually connect to a connection device (not shown) on the load transporting device 100 or wrapped around the central member 25, and may be tightened by actuation of a ratchet-style tie down device 315, or comparable mechanism.

Furthermore, embodiments of the secondary load transporting device 300 may be configured to provide support and engage the protective cage on the opposite side of the cage 250 as the load transporting device 100, as shown in FIG. 6. The secondary load transporting device 300 may allow the user the opportunity to not have to pull back and lift the power trowel 200 to achieve the second position of engagement, while still providing a convenient means to transport the power trowel 200. In other words, a user may not need to constantly provide a pulling force to maintain the second position of engagement (e.g. the forward end 3 in a lifted position), yet still be able to easily and conveniently move the power trowel.

With reference to FIGS. 1-6, an embodiment of a method of transporting a construction equipment may comprise the steps of providing a load transporting device 100 having a central axle portion 20 having at least one wheel 15, and angularly extending a plurality of arms 40, 60 from the central axle portion 20 to match a curvature C of a curvilinear portion of a construction equipment 200, wherein the plurality of angularly extending arms 40, 60 accommodate a load of the construction equipment 200. Further embodiments of the method may include providing a secondary load transporting device 300 to support a forward end 3 of the power trowel.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A load transporting device comprising:
   a central axle portion having at least one wheel;
   a construction equipment engagement portion operably connected to the central axle portion, the construction engagement portion accommodating a protective cage of a power trowel having a curvature, wherein the construction engagement portion matches the curvature of the protective cage of the power trowel; and
   wherein the construction engagement portion includes two angularly extending arms that non-perpendicularly extend directly from the central axle portion and provide downward pressure against a top surface of the protective cage when the power trowel is being lifted by operation of the load transporting device, further wherein a distance between the two angularly extending arms increases from a first end at the central axle portion to a second end distal to the central axle portion.

2. The load transporting device of claim 1, further comprising: a first cage engagement member, a second cage engagement member, and a third cage engagement member, wherein the first cage engagement member is located somewhere along the central axle portion, and the second cage engagement member and the third cage engagement member form part of the construction equipment engagement portion.

3. The load transporting device of claim 1, wherein the two angularly extending arms are rotatably attached to the central axle portion.

4. The load transporting device of claim 1, wherein an axial location of the two angularly extending arms-along the central axle portion is adjustable.

5. The load transporting device of claim 1, wherein the central axle portion and the construction equipment engagement portion are at least one of welded together, structurally integral, and fastened together to form the load transporting device.

6. The load transporting device of claim 1, further comprising: a secondary load transporting device to support a forward end of the power trowel.

7. The load transporting device of claim 6, wherein the secondary load transporting device include a set of angularly extending arms to match the curvature of an additional curvilinear portion of the protective cage of the power trowel.

8. The load transporting device of claim 1, further comprising an additional construction equipment engagement portion operably connected to the central axle portion, the additional construction engagement portion accommodating a handle of the power trowel.

9. The load transporting device of claim 8, wherein the additional construction equipment engagement portion includes one or more operation component engagement members.

10. A load transporting device comprising:
- a central axle portion having at least one wheel mounted thereto, the central axle portion including a first cage engagement member to accept a protective cage of a power trowel at a first location of the protective cage;
- a first arm extending from the central axle portion at a first angle to match a curvature of the protective cage of the power trowel, the first arm having a second cage engagement member to engage a top surface of the protective cage of the power trowel at a second location of the protective cage, wherein the second cage engagement member is a downward facing channel that receives the protective cage within a groove of the downward facing channel;
- a second arm extending from the central axle portion at a second angle to match the curvature of the protective cage of the power trowel, the second arm having a third cage engagement member to engage the top surface of the protective cage of the power trowel at a third location of the protective cage, wherein the third cage engagement member is a downward facing channel that receives the protective cage within a groove of the downward facing channel and
- a secondary loading device to support a forward end of the power trowel.

11. The load transporting device of claim 10, wherein the central axle portion, the first arm, and the second arm, are at least one of welded together, structurally integral, and fastened together to form the load transporting device.

12. The load transporting device of claim 10, wherein the first angle and the second angle of the first arm and the second arm, respectively, are adjustable.

13. The load transporting device of claim 10, wherein the first angle and the second angle are greater than 90°.

14. The load transporting device of claim 10, wherein the second cage engagement member and the third cage engagement member are rotatable.

15. A method of transporting a power trowel comprising:
- providing a load transporting device having a central axle portion having at least one wheel; and
- forming a plurality of angularly extending arms on the central axle portion to match a curvature of a protective cage of the power trowel to lift and transport the power trowel;
- wherein the plurality of angularly extending arms non-perpendicularly extend directly from the central axle portion and provide downward pressure against a top surface of the protective cage when the power trowel is being lifted by operation of the load transporting device, further wherein a distance between the plurality of angularly extending arms increases from a first end at the central axle portion to a second end distal to the central axle portion.

16. The method of claim 15, further comprising: supporting a forward end of the construction equipment with a secondary load transporting device.

* * * * *